No. 866,938. PATENTED SEPT. 24, 1907.
E. U. KINSEY.
VACUUM VENT FOR JARS.
APPLICATION FILED APR. 29, 1907.
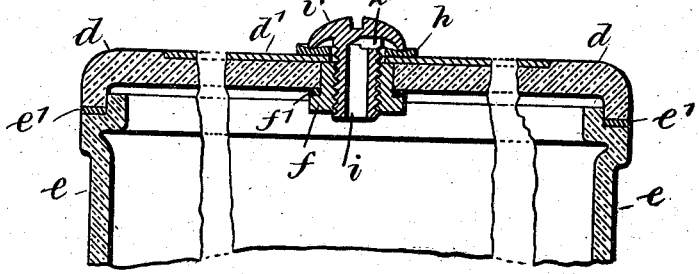
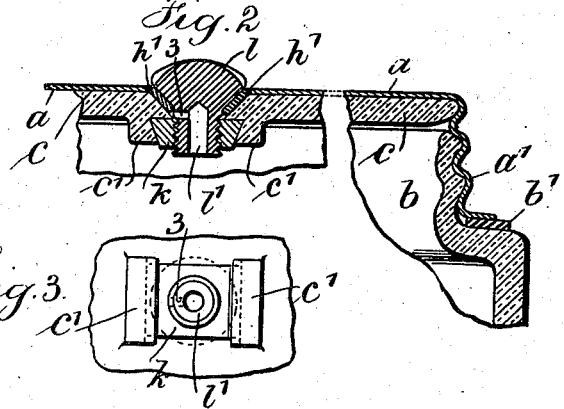
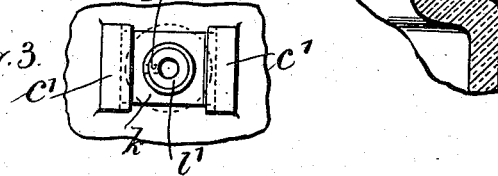
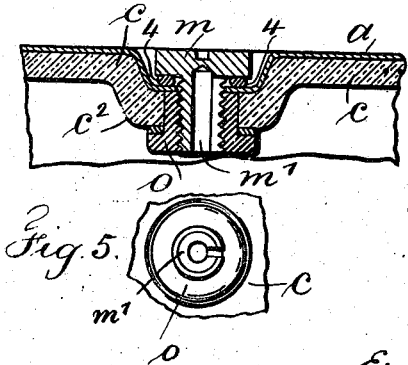
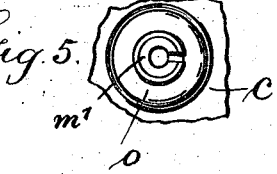
Witnesses
Chas H Smith
A. H. Terrell
Inventor
Ernest U. Kinsey.
per Harold Terrell
his atty.

UNITED STATES PATENT OFFICE.

ERNEST U. KINSEY, OF RUTHERFORD, NEW JERSEY.

VACUUM-VENT FOR JARS.

No. 866,938.　　　　Specification of Letters Patent.　　　　Patented Sept. 24, 1907.

Application filed April 29, 1907. Serial No. 370,776.

*To all whom it may concern:*

Be it known that I, ERNEST U. KINSEY, a citizen of the United States, residing at Rutherford, in the county of Bergen and State of New Jersey, have invented an Improvement in Vacuum-Vents for Jars, of which the following is a specification.

My invention relates to the construction of an opening or vent for jars holding articles of food vacuum sealed and especially to jars for holding fruits and vegetables, having a cover and body of lasting permanent construction which with other capabilities are designed for repeated use, with the object of being able to open the vent with the fingers or a small screwdriver to let the air into the jar and break the seal and to thereafter utilize the instrumentality for further and repeated use.

In carrying out my invention I provide a longitudinally movable tubular screw member having an air vent opening through the stem thereof, a head and washer and a nut through which the screw member moves longitudinally.

The vent or opening is at the base of the head and the under surface of the head seats against the washer, both of which parts are of greater diameter than the tubular stem so that an air tight joint is formed thereby. These parts are preferably secured to the cover of the jar at the center but they may be secured to another part of the cover or to the jar at any desired location.

In the drawing, Figures 1, 2, 4 and 6 are partial vertical central sections showing forms of my invention. Fig. 3 is an inverted plan at the center of Fig. 2. Fig. 5 is an inverted central plan of the parts shown in Fig. 4, and Fig. 7 is an inverted plan of the screw member Fig. 6.

My invention is especially adapted to a fruit or similar jar to be vacuum sealed, in which the body of the jar is made of glass or other suitable vitrified material and the cover of glass to be held on by a screw-span or a cover of metal to screw on to the glass neck of the jar and with which there is a porcelain lining and a rubber seat for the metal top.

Fig. 2 represents the well-known form of jar and cover in which $a$ represents a metal top with a screw flange $a^1$, $b$ the screw-threaded neck of the jar in which the neck and the body are made of glass or other vitrified material, the edge of the top or cover coming down upon a washer $b^1$, and in connection with which metal top or cover there is a porcelain or vitrified material lining $c$.

In Fig. 1 I have shown a glass top $d$ with a central metal plate $d^1$ fitted therein; the body $e$ of glass or vitrified material being off-set to engage the washer $e^1$ of rubber or similar material which is interposed between the edge or top of the cover and the shoulder of the body.

Referring to Fig. 1, $f$ represents the off-set nut placed at the center of the cover or top and extending through the vitrified material cover or top and below the same,— $f^1$ being the washer preferably employed and coming between the off-set part of the nut and the under surface of the top, there being a washer $h$ preferably of rubber upon the outer surface of the metal plate $a$. $i$ represents a longitudinally movable tubular screw member and $i^1$ the head of the same. The stem $i$ is exteriorly threaded to fit the interiorly threaded off-set nut $f$ and the head $i^1$ is of considerably greater diameter than the tubular stem and under the head an opening 2 is made through the stem, the flange of the head setting down upon the washer $h$. It is apparent that when this screw member bears upon the washer $h$ that communication from within the jar with the exterior air is shut off and in this position of the parts the jar can be vacuum sealed with any apparatus provided for that purpose, and to break the seal it is only necessary to turn the head $i^1$ and screw stem $i$ to bring the edge of the head above the surface of the washer so as to permit the air to pass through the opening 2 and the tubular nut into the jar so as to establish an equilibrium of internal and external pressure. The cover can then be lifted and the contents of the jar removed. This form of my invention is adapted for repeated use with the jar.

In Figs. 2 and 3, the porcelain or vitrified lining to the metal top is provided with oppositely disposed lugs $c^1$ of a width agreeing substantially with the depth of a flaring sided nut $k$ slipped between said lugs so that the interiorly threaded opening therein is concentric with the opening in the lining $c$. The upper face of this opening is inclined to receive a tapering conical washer $h^1$. The screw-head $l$ is also conical and the stem $l^1$ thereof is tubular and exteriorly threaded to fit the nut $k$, with an opening at 3 similar to the opening 2 in Fig. 1. I have shown the head $l$ as knurled or cross-ribbed so that it may be turned by the finger instead of a screw-driver, although I do not at all limit my invention as to how the longitudinally movable tubular member shall be turned. The operation is the same with regard to this part as to the parts Fig. 1.

In the form of my invention shown in Figs. 4 and 5, the porcelain lining $e$ is provided with a central depressed portion $c^2$, the longitudinally movable tubular screw member is provided with a flat head $m$ and the metal part $a$ is depressed or dishing to correspond with the porcelain lining, and I prefer to employ a nut $o$ similar to the nut $f$ in Fig. 1 fitting into this depressed center $c^2$ and a washer 4 coming between the surface of the metal $a$ and the under surface of the head $m$, and in this form of my invention instead of employing the opening at 2 or 3 as in the other forms, the tubular stem $m^1$ is cut through on one side to the under surface of the head, consequently at once that the head is raised by turning the air is admitted to the jar.

The form of my invention shown in Figs. 6 and 7 is the same as the form shown in Fig. 4 with the exception of the nut $o$ and the washer between the head of this nut and the under surface of the lining $c$; the tubular screw member in this instance screwing directly into the porcelain lining $c$, and having a stem transversely and centrally slotted at $m^2$.

The forms of my invention agree in identity, operation and function, they are cheaply made and readily applied to a vacuum jar and are comparatively inexpensive in proportion to the life of the jar.

I claim as my invention:—

1. A vacuum vent for jars, comprising a tubular screw stem and integral head member having an air vent opening through the stem beneath the head and a washer against which the head of said member seats.

2. A vacuum vent for jars, comprising a longitudinally movable tubular screw stem and integral head member having an air vent opening through the stem beneath the head, a washer against which the head of said member seats and a nut through which the threaded stem of said member with the head thereof is longitudinally movable.

3. In a vacuum vent for jars, the combination with the jar top or cover, of a centrally apertured threaded nut seated in the body of the top or cover, an exteriorly threaded tubular stem and head integral therewith, there being an opening through the tubular stem and said stem received in said threaded nut and longitudinally movable therein, a washer adapted to lie against the outer face of the top or cover and against which the under surface of said head is adapted to seat to close off the opening and which when turned and the head raised open up communication through the tubular stem between the air and the interior of the jar.

Signed by me this 22d day of April 1907.

ERNEST U. KINSEY.

Witnesses:
GEO. T. PINCKNEY,
E. ZACHARIASEN.